July 19, 1960 P. A. COLMAN 2,945,644
WING STRUCTURE INCORPORATING BOUNDARY LAYER CONTROL
Filed Oct. 9, 1953 3 Sheets-Sheet 1
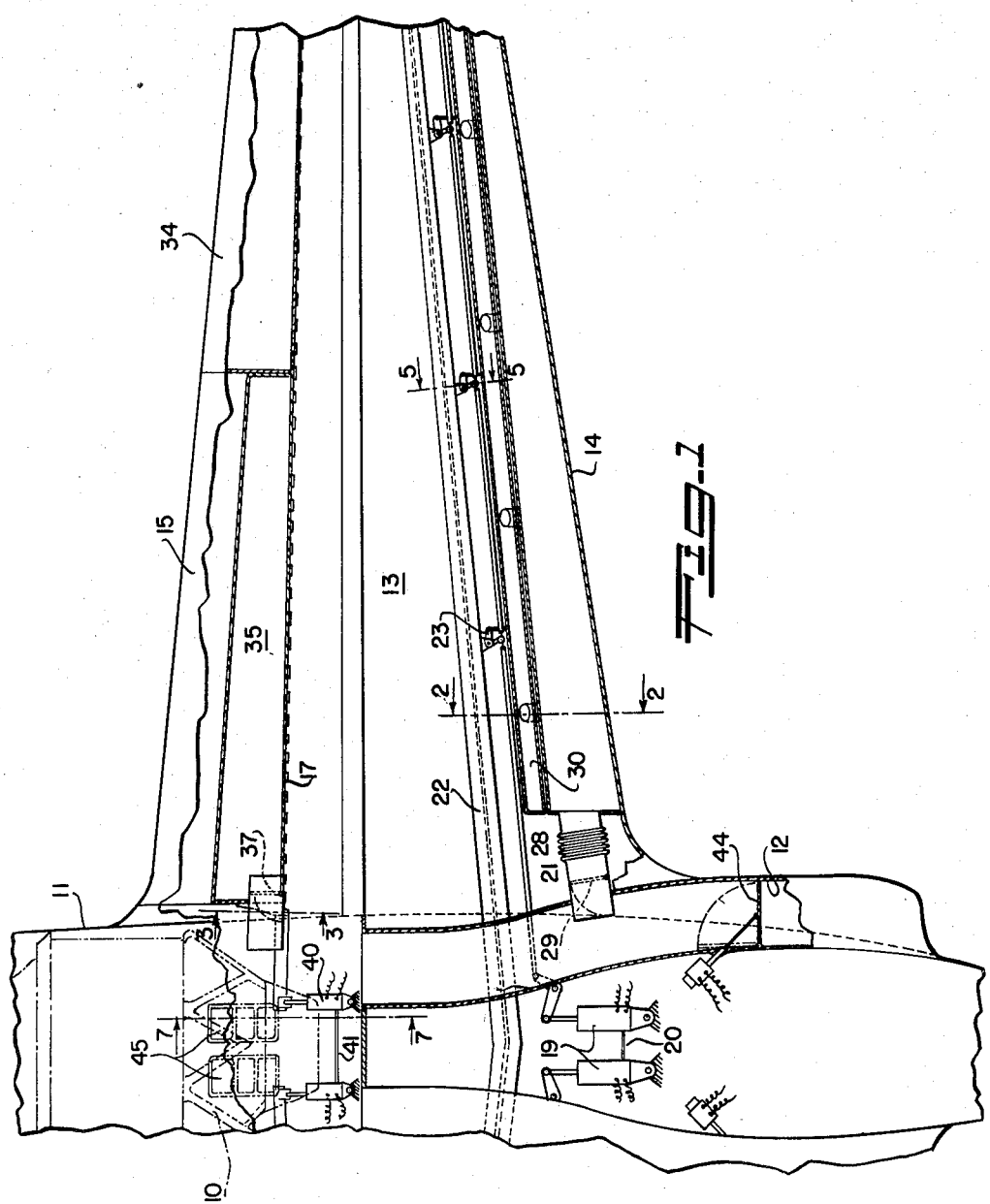
INVENTOR.
PHILIP A. COLMAN
By George A. Sullivan
Agent

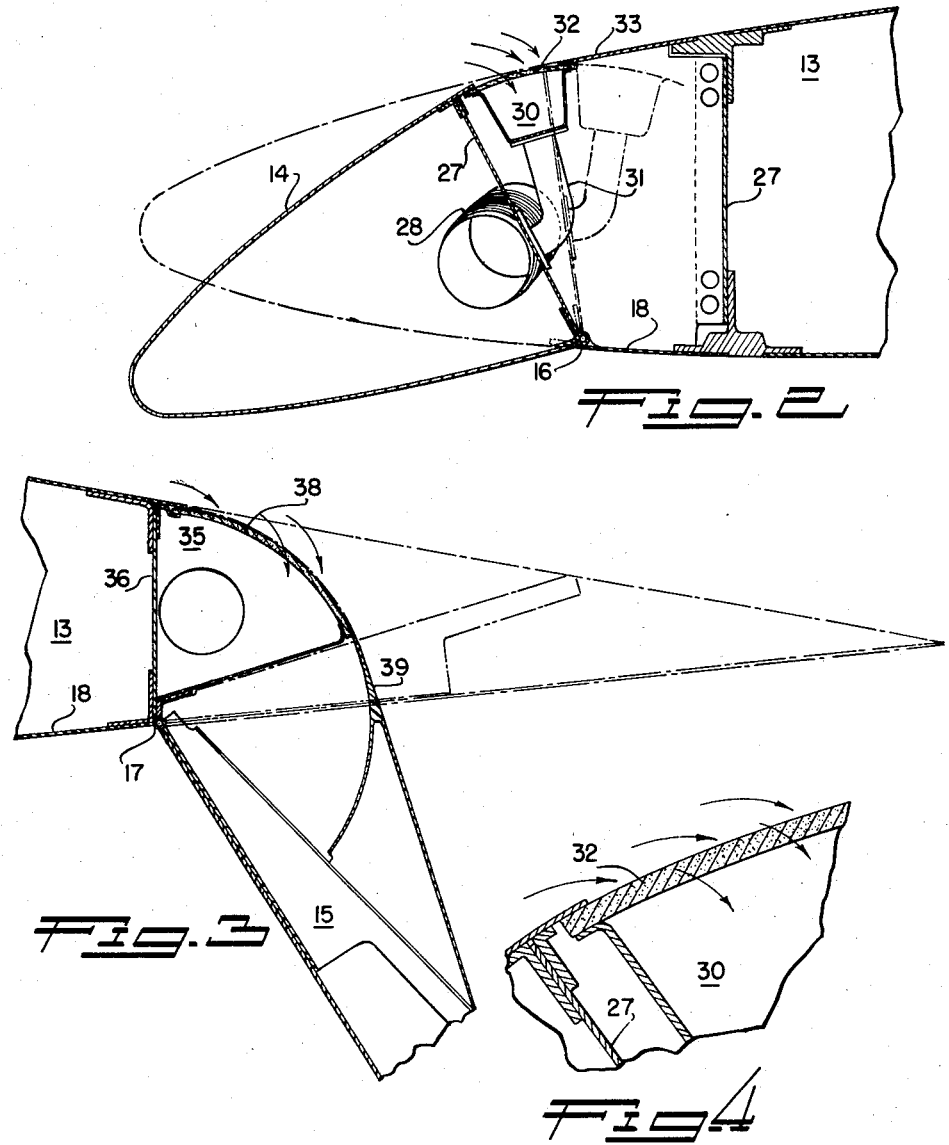

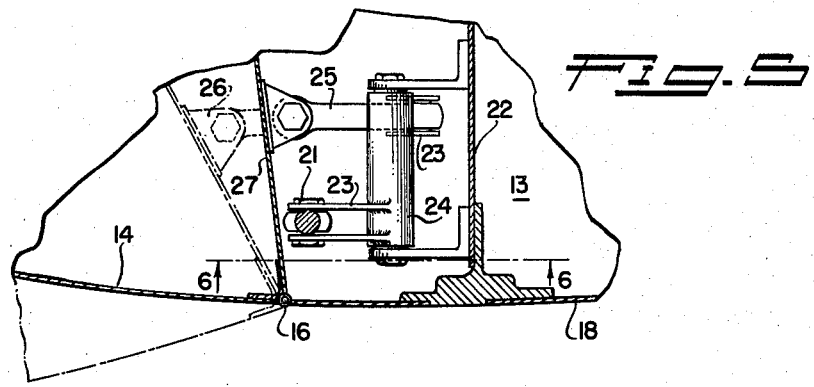
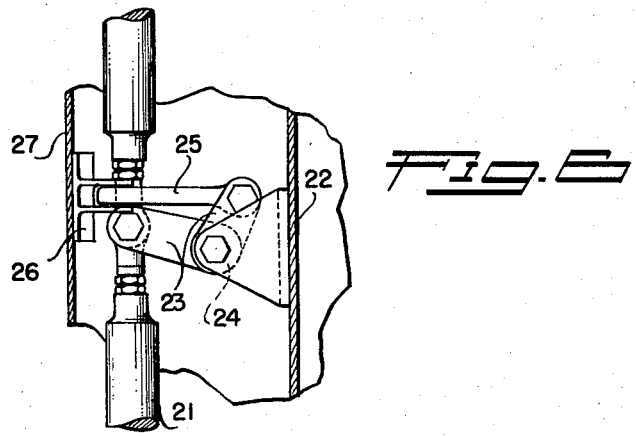
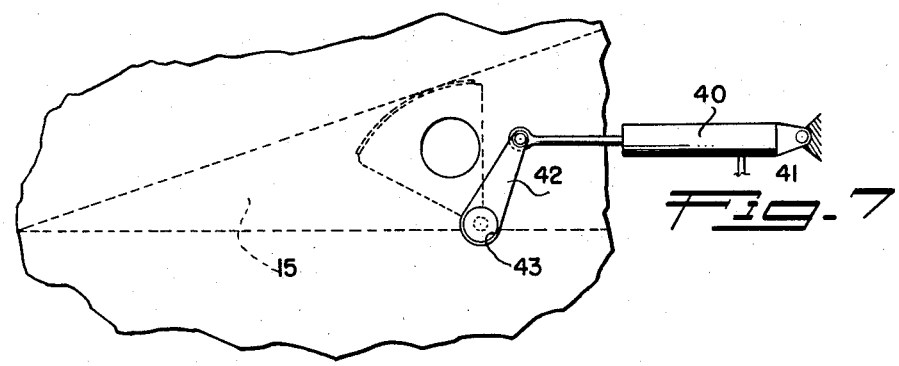
INVENTOR.
PHILIP A. COLMAN

United States Patent Office 2,945,644
Patented July 19, 1960

2,945,644

WING STRUCTURE INCORPORATING BOUNDARY LAYER CONTROL

Philip A. Colman, Beverly Hills, Calif., assignor to Lockheed Aircraft Corporation, Burbank, Calif.

Filed Oct. 9, 1953, Ser. No. 385,135

2 Claims. (Cl. 244—42)

This invention relates to the production of maximum lift in an airplane wing by incorporating boundary layer control in cooperation with deflectable nose and trailing edge flaps.

Boundary layer control proposals of an academic nature have been advanced for many years, such proposals relating to the removal or energizing of the stagnant boundary layer of air clinging to the surface of the wing and tending to increase the separation of the airflow streamlines over the top surface of the wing, which streamlines produce most of the lift or suction on the wing. This invention relates to the removal of the boundary layer adjacent to the hinge lines of the nose and trailing flaps at such times as the flaps are deflected, producing discontinuities or abrupt changes in the profile of the wing section, which abrupt changes in profile facilitate airflow separation therefrom.

It is, accordingly, an important object of this invention to provide a boundary layer control operative in cooperation with nose and trailing flaps when the latter are deflected, to increase the maximum lift of an airplane wing under takeoff and landing approach conditions, to increase the load carrying ability and reduce the stalling speed of the airplane. As a corollary, reducing the stall speed reduces the length of runway required for landing or takeoff, and reduces the wear on the landing gear as well as the impacts thereon due to the decreased speed at touchdown and the decreased momentum of the airplane due to such decreased speed.

It is also an object of this invention to utilize engine suction to remove the boundary layer from critical areas of the wing surface, and to this end to reduce the airflow requirements to create adequate boundary layer suction to a point not critical as regards engine performance. In a turbine-compressor powerplant, for example, any loss in the pressure recovery in the intake ducts to the compressor decreases the mass airflow rate as well as the compression ratio in the compressor, thus directly reducing the engine thrust. In order to avoid such losses as much as possible, this invention contemplates limiting the boundary layer removal to low airplane operating speeds, avoiding the removal of more than the stagnant air layer on the wing surface, thus decreasing the airflow requirements in the boundary layer control ducting, and holding the degree of suction requirements to a minimum pressure differential to avoid penalizing engine performance.

It is a further object of this invention to provide a boundary layer control system, of the type described, wherein a wing is provided with deflectable nose and trailing flaps, the operation of which exposes porous metal coverings for suction ducts, thus rendering the boundary layer control effective in proportion to the deflection of the flaps to aid in maintaining laminar airflow over the wing area opposite to the flap hinges. The combination of such flaps with boundary layer control at the flap hinge lines increases the maximum coefficient of lift from 1.33 with flaps retracted to 1.6 with the nose flap deflected, to 1.9 with both flaps deflected, and adding suction to the wing surfaces opposite the flap hinges increases the maximum lift by at least 50% to 2.9. In terms of calculated performance of a prototype airplane at the same weight, this means a reduction of stall speed from 110 m.p.h. to 84 m.p.h.; landing ground run from 2940 to 1720 feet; takeoff run from 2000 to 1400 feet. Expressed in terms of increased weight for equal stall speeds and runway requirements, the gross weight of the prototype airplane could be increased from 12,500 pounds to 21,000 pounds.

It is also an object of this invention to provide controllable nose and trailing edge flaps, the operation of which automatically energizes a boundary layer control system of the type described.

Other objects and features of the invention will be readily understood from the following detailed description of a typical preferred form of the invention wherein reference will be made to the accompanying drawings in which:

Figure 1 is a fragmentary plan view of a jet powered airplane with the wing skin broken away, showing details of the engine and wing ducting adjacent the hinge line of nose and trailing edge flaps incorporating the boundary layer control arrangement of this invention;

Figure 2 is an enlarged detail section on the lines 2—2 of Figure 1, showing the nose flap arrangement and ducting;

Figure 3 is an enlarged detail section on the lines 3—3 of Figure 1, showing the trailing flap arrangement and ducting;

Figure 4 is an enlarged fragmentary detail section of the porous metal cover of the suction box shown in Figure 2;

Figure 5 is an enlarged section taken on the line 5—5 of Figure 1, showing one of the nose flap actuators;

Figure 6 is a section on the line 6—6 of Figure 5, showing a bottom view of the actuator; and Figure 7 is a section on the line 7—7 of Figure 1, showing the trailing flap actuator mechanism.

As shown on the drawings:

I have chosen to illustrate the application of this invention to a jet driven airplane of the fighter or trainer type wherein a single turbo-jet powerplant 10 is axially mounted in an airplane fuselage 11 having twin air intakes 12 mounted on the sides of the fuselage ahead of the leading edge of a wing 13. The wing 13 is provided with leading 14 and trailing 15 edge flaps which are hinged at 16 and 17 in the lower skins 18 of the wing.

The nose or leading edge flap 14 extends the full length of the wing and preferably has its hinge line 16 at approximately 15% of the wing chord, being designed to deflect downwardly to a maximum of 20 degrees under the control of the pilot. Flap deflection and retraction in each half wing is accomplished by reversible electric actuators 19 linked together by a tachometer shaft 20 to insure simultaneous operation of the nose flaps, each actuator 19 operating a push-pull rod 21 extending along the wing in front of a wing beam 22, the rod 21 serving to actuate a number of bell cranks 23 at intervals along the flap. These bell cranks 23 are best shown in Figures 5 and 6 and include a vertically pivoted shaft 24 and a link 25 connecting to a bracket 26 attached to a rear closure plate 27 for the nose flap 14.

The interior of the nose flap 14 forms a duct for the boundary layer control system and is connected to the engine air intake ducts or through a flexible coupling 28 to compensate for flap movements. A check valve 29 is provided in the coupling to prevent loss of engine air when positive pressure exists in the air intake system.

As best shown in Figure 2, a series of suction boxes 30 are carried by the flap plate 27 between this plate and the forward wing beam 22, these boxes being each connected to the interior of the flap by pipes 31. The tops of these boxes are formed of porous metal 32 in an arc about the flap hinge line and a covering plate 33 is attached to the wing beam 22 overlapping the box cover when the flap is retracted. When the flap is depressed the suction box and its porous metal top move out from under the cover plate 33 to permit flow of boundary layer air through the porous metal into the suction box and thence into the interior of the flap and to the engine intake ducts 12.

Suitable porous metal may comprise sintered granular material, small balls welded together by heat and pressure, or filter material, the object being to provide innumerable tiny passages that will restrict entry of dirt and water into the ducts, limit the boundary layer removal of the turbulent air layer, and maintain the desired suction pressure in the ducts.

The rear or trailing edge flap 15 preferably occupies that part of the trailing edge between an aileron 34 and the side of the fuselage 11 and is designed to deflect downwardly to a maximum of 60° as shown in Figure 3. Boundary layer control is applied to the flap 15 in substantially the same way as described in connection with the nose flap 14 except that the suction duct is stationary because of the large flap deflection, and is uncovered by the deflection of the flap. This arrangement involves a fixed duct 35 running along the rear face of the wing flap beam 36, and opening into the engine intake chamber 35a with a check or non-return valve 37 therein. As before, a wall of the duct 35 is formed from similar porous metal 38 in an arcuate shape centered on the hinge axis 17 of the flap 15 and an extension 39 of the flap upper skin slides thereover. If desired, the duct could be incorporated in the flap as disclosed in connection with the nose flap, but to cover the desired angle of deflection, a swivel joint would probably have to be used instead of the flexible duct section or coupling 28 used with the movable nose flap. Also, the nose flap duct could be fixed as disclosed for the trailing edge flap.

The trailing flap 15 in each wing section is separately operated by an electric actuator 40, the two actuators being interconnected by a tachometer shaft 41 to insure synchronous actuation of the flaps. Each actuator operates a crank arm 42 on a shaft 43 forming an extension of the flap in axial alignment with the flap hinge 17.

In order to enable the engine compressor to pump sufficient suction to create a boundary layer air flow through the ducts under low power conditions, restrictor valves 44 are installed in the engine air intake ducts ahead of the nose flap. The system was designed for sea level operation at a maximum speed of 150 knots, providing a maximum suction of 3 p.s.i. in the engine intake chamber into which the air intakes 12 open. At high power operation such as takeoff, the engine will supply the required suction, but at low power operation such as landing, the restriction valves must be closed to cause the engine to pull the desired suction. In order to protect the engine intake chamber spring loaded suction relief doors 45 are mounted in the wall of the plenum chamber, the spring load being such that the doors open at a suction of 3½ p.s.i. These doors protect the intake chamber and ducting from collapse, as when the engine is run up to full power on the ground.

In the operation of an airplane equipped with the boundary layer control system of this invention, the nose and trailing flaps are normally retracted under cruising and high speed flight conditions, and the suction duct porous metal covers are then in turn covered by impervious flaps of skin material. Under such conditions the maximum coefficient of lift of the wing may be of the order of 1.33, a factor giving ample lift at high flight speeds. Deflecting both the nose and trailing flaps at or below the designed speed of use uncovers the porous metal comprising the tops of the suction ducts for both flaps, and the engine or compressor suction set up in the engine intake chamber is then of such a degree as to establish the desired flow of air adequate to remove the stagnant or turbulent layer of air at the porous metal without also wastefully drawing in the active laminar or streamlined airflow above such boundary layer of air. So-called ram recovery in the engine intake ducts and intake chamber is so low at the slow speeds contemplated as to create sufficient suction to operate the boundary layer control with the engine operating at nearly full power, but under engine idling conditions it may be necessary to close the restriction valves 44 in the intake ducts 12 to allow the engine compressor to pull the necessary degree of suction to establish boundary layer control. While the engine thrust will be reduced approximately 10% at military power by the use of this boundary layer control system, this thrust loss is attributed to the increased loss in engine inlet pressure or ram recovery which is accompanied by a decrease in mass air flow through the engine as well as the engine pressure ratio which directly reduces the engine thrust. When it is necessary to close the restrictor valves under idling conditions to obtain adequate suction for boundary layer control purposes, the engine loss of thrust approximates 15%. These losses are a small price to pay for the performance gains to be obtained which could be measured as a 50% increase in weight for given design conditions, or a corresponding reduction in stall speed and runway requirements for the same weight.

Having described only typical forms of the invention I do not wish to be limited to the specific details herein set forth, but wish to reserve to myself any variations or modifications that may appear to those skilled in the art and fall within the scope of the following claims.

I claim as my invention:

1. A boundary layer control system for an airplane having a turbo compressor power plant comprising an air intake chamber through which air is supplied to the power plant, a wing, nose and trailing edge flaps hingedly mounted adjacent the lower skin of said wing, separately operable means for deflecting said flaps downwardly to increase the camber of the wing section, boundary layer air removal ducts arranged along the hinge lines of said flaps and opening into the intake chamber of the turbo compressor power plant whereby high velocity air in the intake chamber sucks air through the ducts during operation of the boundary layer control system, supplementing the air supply to the power plant from the intake chamber, said ducts having arcuate porous metal walls disposed opposite to the hinge lines of the flaps and arranged to form continuations of the upper skin of the wing when the flaps are deflected, skin flaps overlying said arcuate porous metal walls in the flap retracted position whereby deflection of the flaps exposes the arcuate porous metal walls of the ducts in proportion to the flap deflection, and check valves carried in said ducts to prevent back flow from the turbo compressor power plant.

2. A boundary layer control system as defined in claim 1 including valve means carried within said intake chamber and restricting the normal intake air supply from the intake chamber to the turbo compressor power plant only when the valve means is moved from the open position to increase the flow of supplementary air through ducts.

References Cited in the file of this patent

UNITED STATES PATENTS

| | | |
|---|---|---|
| 2,423,803 | Stalker | July 8, 1947 |
| 2,496,565 | Stalker | Feb. 7, 1950 |
| 2,517,524 | Beck | Aug. 1, 1950 |
| 2,568,813 | Lundberg | Sept. 25, 1951 |

FOREIGN PATENTS

| | | |
|---|---|---|
| 479,598 | Great Britain | Feb. 7, 1938 |
| 504,747 | Great Britain | May 1, 1939 |